US009807263B2

(12) United States Patent
Bala et al.

(10) Patent No.: US 9,807,263 B2
(45) Date of Patent: Oct. 31, 2017

(54) MOBILE DOCUMENT CAPTURE ASSISTANCE USING AUGMENTED REALITY

(71) Applicant: Conduent Business Services, LLC, Dallas, TX (US)

(72) Inventors: Raja Bala, Pittsford, NY (US); Lina Fu, Fairport, NY (US); Hengzhou Ding, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 225 days.

(21) Appl. No.: 13/664,810

(22) Filed: Oct. 31, 2012

(65) Prior Publication Data

US 2014/0118560 A1    May 1, 2014

(51) Int. Cl.
*H04N 5/225* (2006.01)
*H04N 1/00* (2006.01)
*H04N 5/232* (2006.01)
*H04N 1/195* (2006.01)

(52) U.S. Cl.
CPC ..... *H04N 1/00466* (2013.01); *H04N 1/19594* (2013.01); *H04N 5/225* (2013.01); *H04N 5/23293* (2013.01)

(58) Field of Classification Search
CPC ...................... H04N 5/225; G06T 2207/30176
USPC ........................................................ 348/207.1
See application file for complete search history.

(56) References Cited

U.S. PATENT DOCUMENTS

| 5,821,523 | A | 10/1998 | Bunte et al. |
| 7,303,131 | B2 | 12/2007 | Carlson et al. |
| 7,561,725 | B2 * | 7/2009 | Liang ........................... 382/128 |
| 2006/0244749 | A1 * | 11/2006 | Kondo .................... G06T 15/20 345/427 |
| 2007/0090190 | A1 | 4/2007 | Kuromatsu et al. |
| 2007/0183652 | A1 | 8/2007 | Backstrom et al. |
| 2007/0228174 | A1 | 10/2007 | Vinogradov et al. |
| 2009/0062001 | A1 * | 3/2009 | LeMay et al. .................. 463/32 |
| 2009/0190831 | A1 | 7/2009 | Van Der Putten |
| 2009/0212113 | A1 | 8/2009 | Chiu et al. |
| 2010/0130250 | A1 | 5/2010 | Choi |

(Continued)

OTHER PUBLICATIONS

Girod et al., "Mobile Visual Search", IEEE Signal Processing Magazine, Special Issue on Mobile Media Search, pp. 1-11.

(Continued)

*Primary Examiner* — Antoinette Spinks
(74) *Attorney, Agent, or Firm* — Fox Rothschild LLP

(57) ABSTRACT

A method and device for aligning an image of a printed substrate using a mobile device. The method includes receiving, by an image capturing device, an image stream of a printed substrate; determining, by a processing device operably connected to the image capturing device, a location and a geometry of the printed substrate from the image stream; displaying, on a display operably connected to the processing device, the image stream; overlaying, by the processing device, at least a first visual marker onto the printed substrate as displayed in the image stream using the location and geometry; and instructing, by the processing device, a user of the mobile device to move the mobile device to align the mobile device and the printed substrate. The device includes the various hardware components configured to perform the method of aligning.

24 Claims, 6 Drawing Sheets

(56) References Cited

U.S. PATENT DOCUMENTS

| | | |
|---|---|---|
| 2011/0007967 A1 | 1/2011 | Soderberg et al. |
| 2011/0035661 A1* | 2/2011 | Balinsky .............. G06F 17/218 |
| | | 715/243 |
| 2011/0090252 A1 | 4/2011 | Yoon et al. |
| 2011/0091092 A1 | 4/2011 | Nepomniachtchi et al. |
| 2012/0289306 A1* | 11/2012 | Kryuchkov et al. ............ 463/20 |
| 2013/0155474 A1 | 6/2013 | Roach et al. |
| 2013/0286249 A1* | 10/2013 | Yost et al. .............. 348/231.99 |
| 2013/0335445 A1 | 12/2013 | Bala et al. |

OTHER PUBLICATIONS

Hull et al., "Paper-Based Augmented Reality", 17th International Confernece on Artificial Reality and Telexistence 2007, pp. 205-209.

Chen et al., "Streaming Mobile Augmented Reality on Mobile Phones", IEEE International Symposium on Mixed and Augmented Reality 2009 Science and Technology Proceedings, Oct. 19-22, Orlando, Florida, pp. 181-182.

\* cited by examiner

MOBILE DOCUMENT CAPTURE ASSISTANCE USING AUGMENTED REALITY

BACKGROUND

Mobile devices, such as smartphones, tablet computers, and other similar computing devices, are increasingly being used for capturing and processing data. Typically, a mobile device includes a high quality camera that can be used to capture images of printed documents. For example, a customer may be asked to print and fill out a form, and send a digital copy of the completed form to a specific vendor. The user may opt to capture an image of the form with their mobile device. Software installed on the device may then further process the captured image. For example, the software may be configured to enhance, recognize, store and share the images of printed documents. Continuing the above example, the user may store the captured image of the form and transmit the image to the vendor.

The mobile device used to capture the image of the printed document may be limited by software and hardware components within the device. For example, the mobile device's camera may contain a camera lens that has a focal length that prevents the lens from accurately focusing on an object a short distance away. When such a limitation exists, a user holding the device too closely to the printed document may not be able to properly focus upon the printed document.

Similarly, if the mobile device is not in a parallel plane to the printed document being captured, the image may be distorted, resulting in a low quality image. This perspective distortion can adversely affect optical character recognition (OCR) and other recognition algorithms. Perspective distortion correction can be applied after capture; however, the resolution that is inherently lost as a result of the distortion can never be recovered perfectly via digital processing after the image is captured.

SUMMARY

In one general respect, the embodiments disclose a method of aligning an image of a printed substrate using a mobile device. The method includes receiving, by an image capturing device, an image stream of a printed substrate; determining, by a processing device operably connected to the image capturing device, a location and a geometry of the printed substrate from the image stream; displaying, on a display operably connected to the processing device, the image stream; overlaying, by the processing device, at least a first visual marker onto the printed substrate as displayed in the image stream using the location and geometry; and instructing, by the processing device, a user of the mobile device to move the mobile device to align the mobile device and the printed substrate.

In another general respect, the embodiments disclose a device for aligning an image of a printed substrate using a mobile device. The device includes a processor, an image capturing device operably connected to processor, a display operably connected to the processor, and a computer readable medium operably connected to the processor. The computer readable medium contains a set of instructions configured to instruct the device to receive an image stream of a printed substrate, determine a location and a geometry of the printed substrate from the image stream, display the image stream, overlay at least a first visual marker onto the printed substrate as displayed in the image stream using the location and geometry, and instruct a user of the mobile device to move the mobile device to align the mobile device and the printed substrate.

DETAILED DESCRIPTION

Figure 1:
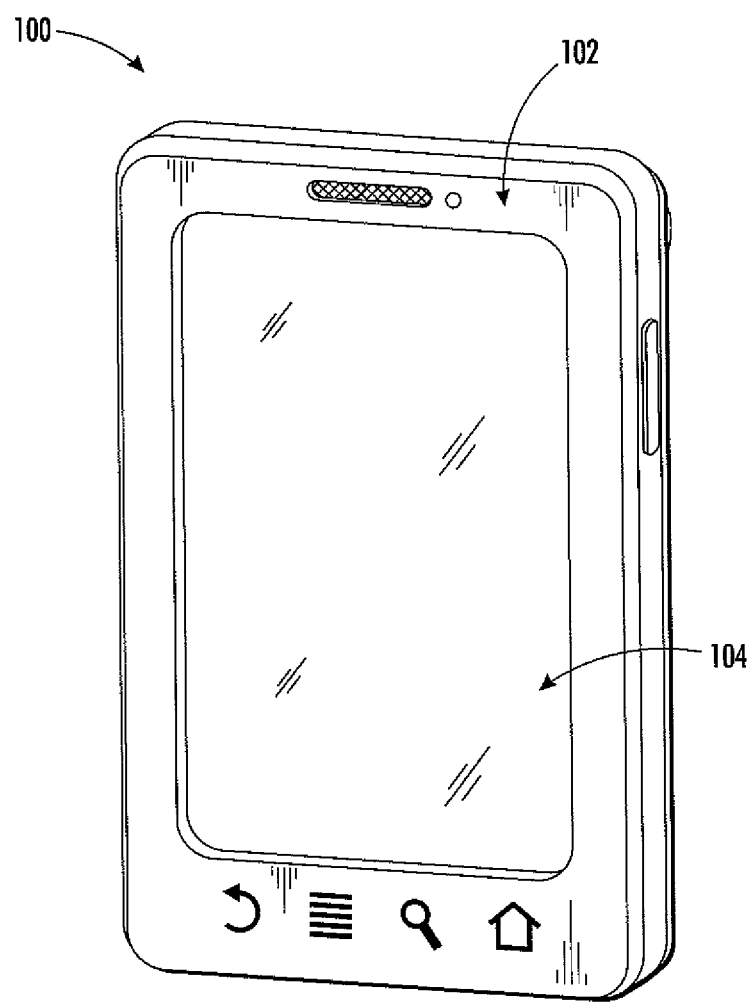
FIG. 1 depicts a first or front face of a mobile device that includes a camera configured to capture an image according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this document, a "printed document" or "document" refers to a hardcopy of one or more pieces of printed substrates containing a combination of text and/or images. For example, the document may be a form, a page from a book or other publication, a poster, a billboard or another similar form of advertising, and any other printed surface.

A "mobile device" refers to a portable computing device that includes an image capturing device, a processor and tangible, computer-readable memory. The memory may contain programming instructions in the form of a software application that, when executed by the processor, causes the device to perform one or image acquisition and processing operations according to the programming instructions. Examples of suitable devices include portable electronic devices such as smartphones, personal digital assistants, cameras, tablet devices, electronic readers, personal computers, media players, satellite navigation devices and the like.

An "imaging device" refers to any device capable of optically viewing an object and converting an interpretation of that object into electronic signals. One such example of an imaging device is a camera. An "image capture module" refers to the software application and/or the image sensing hardware of an electronic device that is used to capture images.

"Geometry" refers to a 3-dimensional position and orientation of an object being captured by an imaging device. The position and orientation may be defined with respect to some absolute world coordinates or relative to the position and orientation of the imaging device. Three-dimensional geometry is usually inferred from the two-dimensional captured image by assuming certain properties of the object (e.g. planar object of rectangular shape) and the imaging device (e.g. pinhole camera model).

"Augmented reality" (AR) refers to the concept of combining a real scene viewed by a user with a virtual scene generated by a computing device such that the real scene is augmented with additional useful information.

The use of mobile devices for scanning printed documents comes with unique opportunities as well as unique challenges. Advantages include low-cost, portability, ubiquity, increasing computational power, and the integration of multiple imaging devices and image capture modules into a single mobile device. Challenges include the variety of capture conditions, including lighting variation, geometry of the object being captured, motion caused blur, and other factors that can affect image quality. As described herein, various concepts related to AR may be incorporated into an image capturing process as used by a mobile device to improve the quality of printed document images captured by the mobile device.

Various aspects of AR may be integrated into the image capturing process to reduce problems associated with geometric or perspective distortion, which can greatly affect the quality of an image of a printed document for use in optical character recognition (OCR) and other recognition applications. Using AR techniques, a user of a mobile device may be prompted to align the imaging device to be parallel to a document plane during the capturing process, thus minimizing perspective distortion and obviating the need to apply sophisticated perspective correction algorithms to the image.

FIG. 1 shows one example of a mobile device, generally designated 100. The mobile device 100 may include a front face 102 and a display 104. The display 104 may be any suitable component for displaying images, including, but not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays. The display 104 may further include a touch sensitive screen, including, but not limited to, resistive touchscreens, capacitive touchscreens, and infrared touchscreens.

Figure 2:
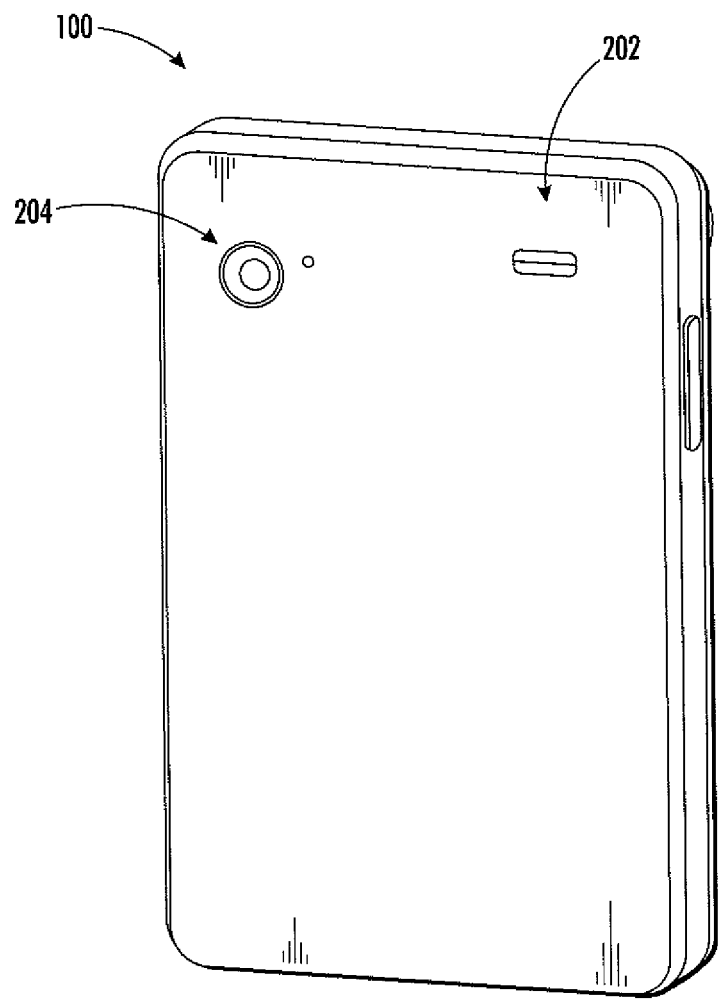
FIG. 2 depicts a second or rear face of a mobile device that includes a camera configured to capture an image according to an embodiment.

FIG. 2 shows a rear face 202 of the mobile device 100. The rear face 202 may include an imaging device 204. The imaging device 204 may be any suitable component capable of receiving an optical image and transmitting the information to other components for processing.

The imaging device may further have an ability to adjust its focal length and aperture in such a manner that would allow it to zoom and properly focus upon an intended object to be imaged. This adjustment may define an "optimal focal distance," or a range of distances in which the mobile device 100 may be properly positioned from the intended object to be imaged to achieve a clear image.

While the imaging device 204 is depicted on the rear face of the present example, persons skilled in the art will appreciate that the imaging device 204 may be positioned at any location upon any face of the mobile device 100, or may even be external to the mobile device 100 and connected by any means of electronic communication, including, but not limited to, physical cable communication such as universal serial bus (USB), wireless radio communication, wireless light communication, or near field communication technology.

In some embodiments, the display 104 may be positioned within the mobile device 100, and may be configured in such a way so as to display the output of the imaging device 204 in real time so that the user may view the display 104 and see the output of the imaging device 204 on the display.

Accordingly, the configuration of the mobile device 100 as shown in FIGS. 1 and 2 is only an example, and persons skilled in the art will appreciate other configurations that are able to achieve a similar overall result.

Figure 3:
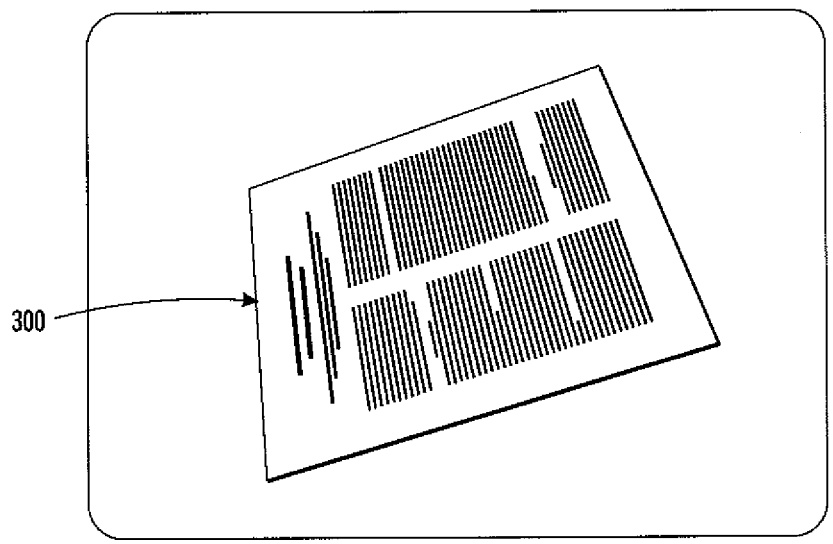
FIG. 3 depicts an example of a printed document to be captured according to an embodiment.

The mobile device 100 may be used to capture an image of a printed document 300, as shown in FIG. 3. The mobile device 100 may be positioned so that the imaging device 204 is facing the printed document 300 desired to be imaged. Preferably, but not necessarily, the printed document 300 is placed on a flat (but not necessarily horizontal) surface as is shown in FIG. 3. The imaging device 204 may be activated to view the printed document 300, wherein the mobile device 100 may capture and render an image depicting the printed document 300 upon the display 104 by use of an image capture module.

Figure 4:
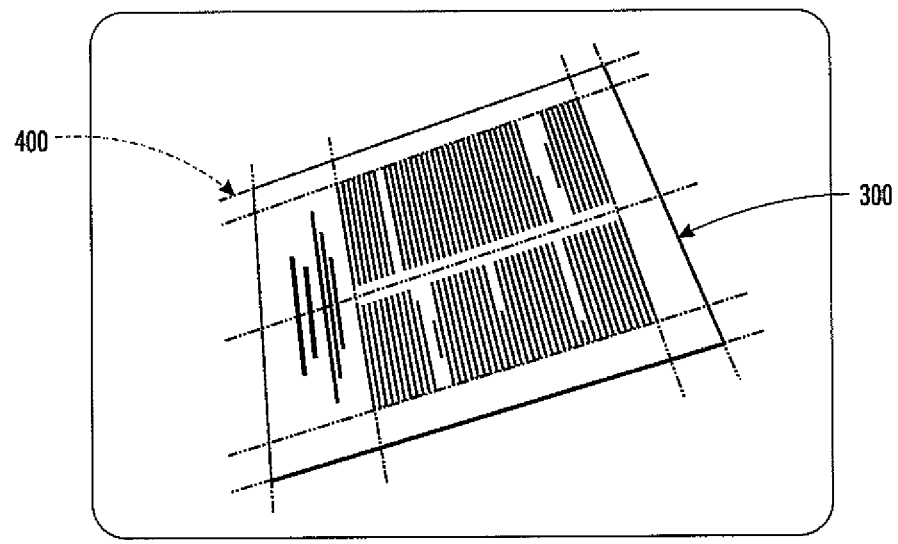
FIG. 4 depicts an example of detecting various structures in a printed document to be captured according to an embodiment.

As shown in FIG. 4, the image capture module or another similar software module may capture and analyze the image of the printed document 300 to determine the location, orientation and geometry of the printed document. For example, the software module may extract a series of straight-line features 400 in the image of the printed document 300. A technique such as the Hough Transform may be used to identify straight-line features in an image of a printed document. These straight-line features may provide information about the geometry of the printed document. For example, vanishing points may be estimated from sets of convergent lines that are parallel in three dimensions. Knowledge of two vanishing points of convergent sets that are mutually perpendicular, along with knowledge of, or an assumption on, the field of view in a pinhole camera model may be used to estimate the orientation of the printed document plane.

Alternate techniques may be used by the software module to estimate the geometry of the printed document 300. For example, the software module may be configured to assume the printed document 300 is a rectangle unless instructed otherwise by the user. The software module may locate each corner of the printed document 300 in the camera image, and use this to derive the shape of the document, which in turn enables estimation of the three-dimensional geometry of the document.

For example, the software module may extract a grid of lines 400 from analysis of the printed document 300. The software module may estimate the angle of each corner of the printed document 300 as indicated by the grid 400, the length of each side of the printed document, and other similar physical properties of the document. Based upon the corner angles, the lengths of sides as compared to one another (e.g., a comparison of parallel side lengths), and other features, the software may estimate the current geometry of the printed document 300 based upon expected corner angles and side lengths for a rectangular document. If the software modules measures the printed document 300 to have 90° corners and parallel sides of equal length, the software module may estimate the printed document is in parallel plane to the mobile device (or the image capture device of the mobile device).

Alternatively or additionally, the geometry estimation may include preloaded versions of printed documents that may be used to quickly estimate the geometry of the printed document 300. For example, an image of an undistorted or ideal version of the printed document may be stored in memory on the mobile device 100 and may serve as a reference image. The image of the printed document 300 as captured by the mobile device may be analyzed to determine corresponding features between it and the reference image, and the software module may estimate the geometry of the printed document 300 based upon the corresponding features. For example, a specific form may include a specific arrangement of text blocks, whitespaces and images that is unique to that form. The text, whitespaces and images may be contained within the top or bottom margin of the form, or another similar location on the printed document for easy location. The software module may locate the unique arrangement of text blocks, whitespaces and images and compare the arrangement against all reference images stored in memory. Based upon the comparison, the software module may identify the specific form and determine the current geometry of the form based upon a comparison of one or more features of the form (e.g., corner angles, side lengths, text block arrangement) with the reference image. Alternatively, low-level image features of interest points such as Scale Invariant Feature Transformation (SIFT), Speeded Up Robust Features (SURF), Harris corner detector, and other similar comparison techniques may be used to establish correspondence between captured and referenced images, and to derive the geometry of the printed document.

Figure 5A:
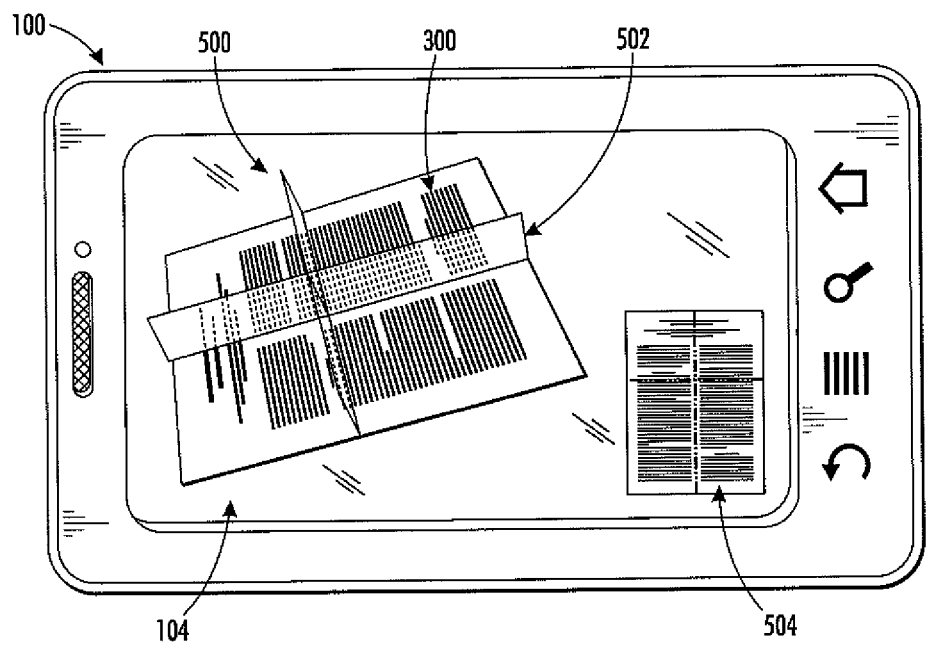
FIG. 5A depicts an example of a screenshot of a displayed document including an example of a visual marker according to an embodiment.

As shown in FIG. 5A, once the geometry of the printed document 300 is determined, a virtual visual marker 502 may be overlaid on an image 500 of printed document 300 and displayed on display 104 of mobile device 100 along with the image 500 in accordance with the computed geometry. The visual marker 502 may be a virtual geometric shape or arrangement of shapes digitally overlaid onto the image 500 using an AR software package such as the Vuforia™ AR software package developed by Qualcomm, Inc. As shown in FIG. 5A, the visual marker 502 may include two planar strips oriented perpendicular to the place of the printed document 300, and perpendicular to one another, to resemble a plus sign, running down the middle of the image 500 of the printed document 300 along both the length and the width of the printed document 300.

As the user of the mobile device 100 moves the mobile device, the image 500 of the virtual marker 502 moves along with the printed document 300 to convey the appearance that the virtual marker is physically connected to the printed document. This feature may utilize real-time and continuous computation of the location and geometry of the printed document 300.

In order to accurately fit the image 500 within the display 104, the size of the image 500 may be increased by moving the mobile device 100 closer to the printed document 300. Similarly, the size of the image 500 may be decreased by moving the mobile device 100 farther away from the printed document 300.

As an alternative to moving the mobile device 100 with respect to the printed document 300, the imaging device 204 may be adjusted by mechanical, electronic, or software means to alter the focal length and aperture of the imaging device 204 to zoom in or out to achieve a desired size for the image 500. Similarly, the imaging device 204 may be adjusted by mechanical, electronic, or software means to focus upon the printed document 300 to ensure that the image 500 presented upon the display 104 is crisp, easily viewable and not blurry.

As another alternative to the above, the size of the image 500 may be increased or decreased by varying a zoom factor of the imaging device 204. Whereupon a user alters the zoom factor, the size of the visual marker 502 may be adjusted in a proportional manner.

The visual marker 502 may be a graphical representation of the current estimated geometry of the printed document 300, and is displayed on the display 104 in such a manner that it can be used as a tool by the user or the software application loaded onto the mobile device 100 to properly align the mobile device 100 and the printed document 300 in a similar plane. For example, as shown in FIG. 5A (and discussed briefly above), the visual marker 502 may include two planar strips oriented perpendicular to the plane of the printed document 300, and perpendicular to one another, to resemble a plus sign. However, this is merely provided by way of example and the visual marker 502 may represent various other geometric shapes. For example, the visual marker 502 may be a series of four planar strips forming a rectangle, where each strip of the visual marker is positioned to correspond with one side of the document. Additionally, multiple visual markers may be overlaid on a single image. For example, four "L" shaped visual markers may be overlaid on the image, one at each corner of the document and rotated and sized accordingly such that the angle of each corner is clearly indicated.

Figure 5B:
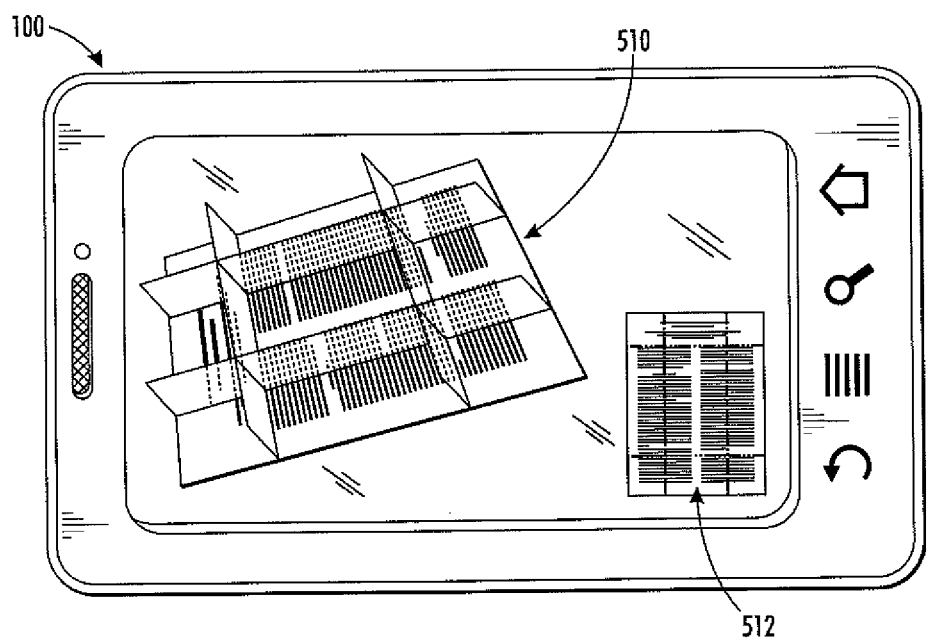
FIG. 5B depicts a second example of a screenshot of a displayed document including a second example of a visual marker according to an embodiment.

The visual marker 502 may further be generated by the software application. The visual marker 502 may be of a fixed or variable size, and may be positioned at any suitable location upon the display 104. Similarly, the visual marker 502 may be of any color or transparency that provides a useful and positive user experience. Furthermore, the visual marker 502 may be of any suitable shape and size that is capable of matching the shape and size of the printed document 300 being imaged. For example, as shown in FIG. 5B, a second visual marker 510 may be overlaid on the image 500 of the printed document 300.

As shown in FIG. 5A, a small icon 504 may be shown on the display 104, illustrating to the user of the mobile device 100 how the visual marker 502 should appear when the printed document 300 is properly aligned. Similarly, FIG. 5B shows a small icon 512, illustrating how the visual marker 510 should appear on the display 104 when the printed document 300 is properly aligned.

It should be noted that 100% alignment may not be required for capturing an image of a printed document. Based upon the quality of the image capturing device, the capabilities of any software performing post image capture processing on the image, and other similar factors an acceptable tolerance may be determined and integrated into the above-discussed image capture process.

When the mobile device 100 and the printed document 300 are not aligned, the visual marker 502 may appear as a three-dimensional marker. When the mobile device 100 and the printed document 300 are aligned, the visual marker 502 may appear as a two-dimensional marker as is illustrated in icon 504 (and similarly in icon 512 in FIG. 5B).

It should be noted that the visual markers 502, 510 as shown in FIGS. 5A and 5B are shown by way of example only. Additional shapes such as a box surrounding the document may be used. Similarly, additional information may be overlaid on the image of the printed document, providing the user with additional information. For example, arrows may be overlaid showing the user how to rotate the mobile device 100 to properly align it with the printed document 300. Additionally, the user may be notified when the printed document 300 and the mobile device 100 are properly aligned. For example, the visual markers 502, 510 may disappear when aligned. Alternatively, a visual, audio, haptic, or other similar signal may be given to the user when the mobile device 100 and the printed document 300 are aligned.

Figure 6:
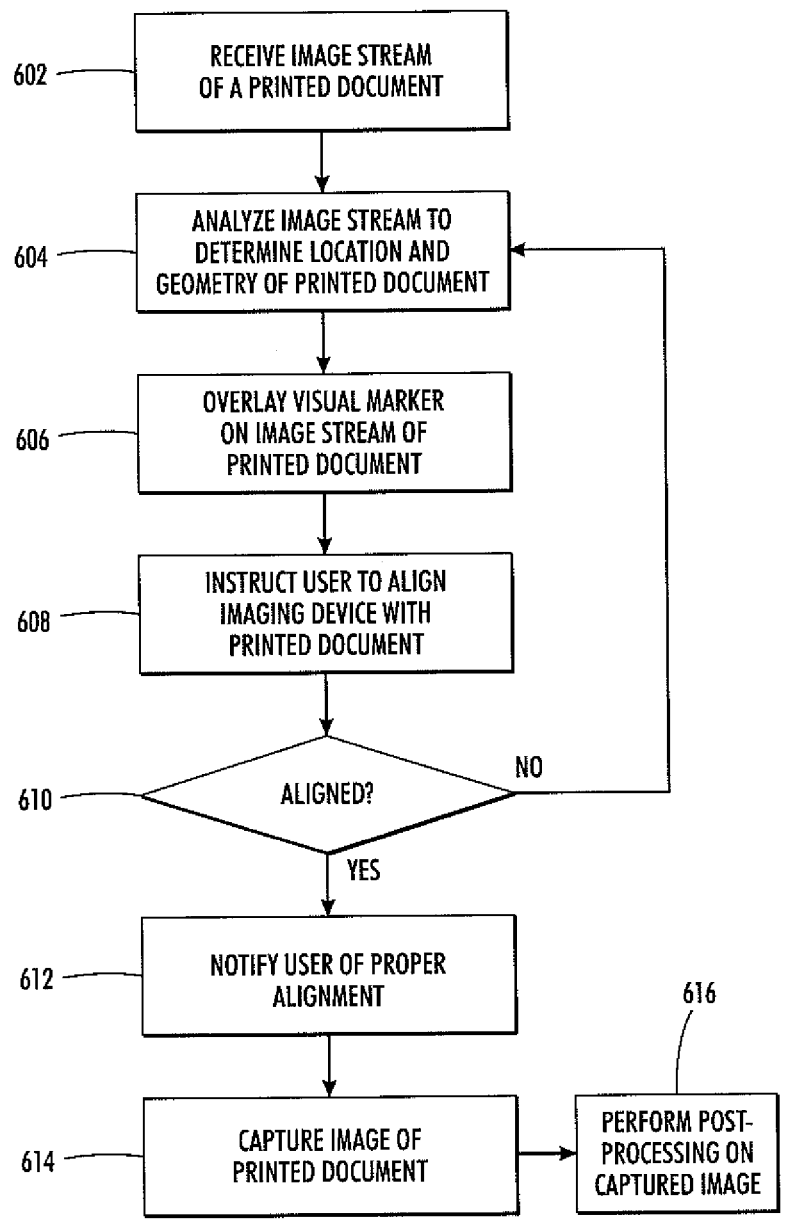
FIG. 6 depicts a flow chart example of a process for viewing and capturing an image of a printed document using visual markers to properly align the image according to an embodiment.

FIG. 6 depicts a sample process flow for aligning and acquiring an image using the concepts and ideas as discussed above. A mobile device may receive 602 an image stream or video capture of a printed document, and display the image stream on the display of the mobile device. The image stream may be live view of the printed document as it is currently aligned and oriented in relation to the mobile device.

An image capture module or other similar software module running on a processor of the mobile device may analyze 604 the image stream to determine a location and geometry of the printed document. As discussed above, analyzing 604 the printed document may include estimating a series of straight-line features from the image of the printed document. Alternatively, several techniques may be used by the software module to estimate the geometry of the printed document. For example, the software module may be configured to assume the printed document is a rectangle unless instructed otherwise by the user. The software module may locate each corner of the printed document and, based upon the angle of each corner, and/or shape of the printed document, estimate the geometry of the printed document. Similarly, features in the printed document such as rows of text, tables, paragraph edges, or low level features such as SIFT, SURF, Harris, in conjunction with corresponding features in an ideal reference image, may be used to aid in geometry estimation.

Based upon the determined location and geometry of the printed document, the software module may overlay 606 one or more visual markers onto the image stream of the printed document such that the visual marker is positioned on the printed document in the image stream. The software module may instruct 608 the user of the mobile device to align the imaging device of the mobile device with the printed document. Instructing the user may include overlaying an additional visual marker such as an arrow onto the image stream, the arrow indicating which direction the user should move the mobile device in order to align it with the printed document.

The software module may determine if the mobile device and the printed document are properly aligned 610. If the software module determines the mobile device and the printed document are not properly aligned 610, the software module may analyze 604 the updated position of the printed document with respect to the mobile device, update the overlaid 606 visual marker, and instruct 608 the user to move the mobile device in an effort to align the image capture device with the printed document. If the software module determines the mobile device and the printed document are aligned 610, the user may be notified 612 of the alignment.

When the user is notified 612 of the alignment, the notification may include an alteration of the image stream. For example, the visual indicator may be removed from the image stream, the color of the printed document may change, or another similar visual indicator may be performed. Similarly, an audio indicator such as a chime or bell ring, or a haptic indicator such as a vibration, may indicate proper alignment.

The user may then opt to capture 614 an image of the printed document. Post-processing 616 may then be performed on the captured image. The post-processing 616 may include performing an OCR or other similar recognition algorithm, identifying if the document is a form, updating meta-data associated with the captured image, enhancing the quality of the captured image, and other similar post-processing techniques.

Figure 7:
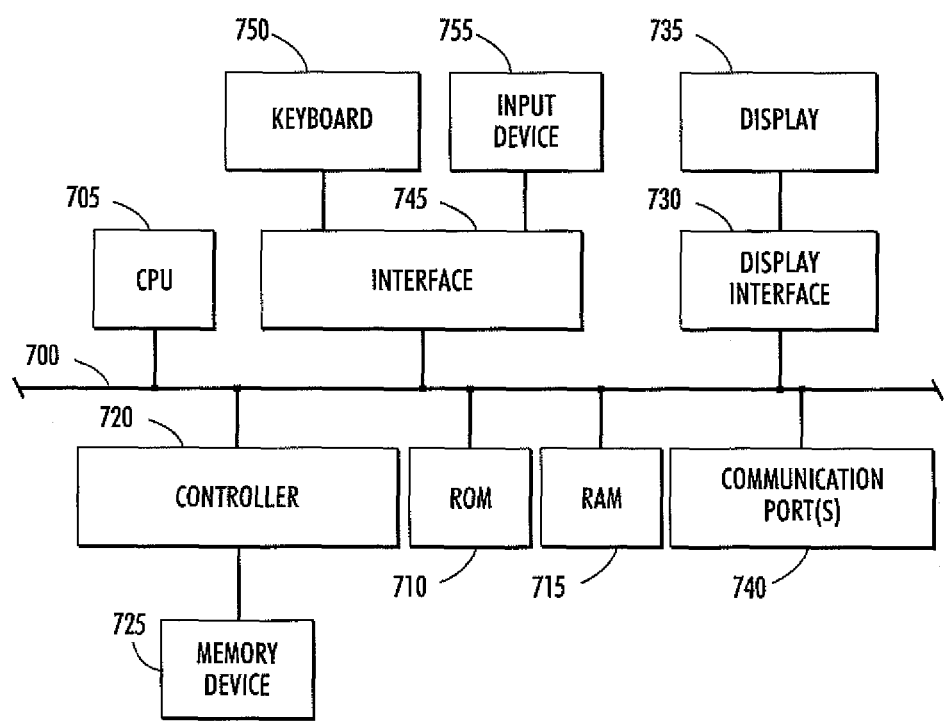
FIG. 7 depicts various embodiments of a computing device for implementing the various methods and processes described herein

As discussed above, the image alignment and capture method and process as described above may be performed and implemented by an operator of a mobile device. FIG. 7 depicts an example of internal hardware that may be used to contain or implement the various computer processes and systems as discussed above. For example, mobile device 100 as discussed above may include a similar internal hardware architecture to that as illustrated in FIG. 7. An electrical bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 7, is a processing device, computing device or processor as such terms are used within this disclosure. Read only memory (ROM) 710 and random access memory (RAM) 715 constitute examples of memory devices.

A controller 720 interfaces with one or more optional memory devices 725 to the system bus 700. These memory devices 725 may include, for example, an external DVD drive or CD ROM drive, a hard drive, flash memory, a USB drive or the like. As indicated previously, these various drives and controllers are optional devices. Additionally, the memory devices 725 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 710 and/or the RAM 715. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

A display interface 730 may permit information from the bus 700 to be displayed on the display 735 in audio, visual, graphic or alphanumeric format. Communication with external devices may occur using various communication ports 740. A communication port 740 may be attached to a communications network, such as the Internet, a local area network or a cellular telephone data network.

The hardware may also include an interface 745 which allows for receipt of data from input devices such as a keyboard 750 or other input device 755 such as a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of aligning an image of a printed substrate using a mobile device, the method comprising:
   receiving, by an image capturing device, an image stream of a printed substrate;
   determining, by a processing device operably connected to the image capturing device, a location and a geometry of the printed substrate from the image stream;
   displaying, on a display operably connected to the processing device, the image stream;
   overlaying, by the processing device, at least a first visual marker onto the printed substrate as displayed in the image stream using the location and geometry;
   determining, by the processing device, an acceptable alignment tolerance based on at least one of the following: a quality of the image capturing device or a capability of available post image capture processing software;
   determining, by the processing device, if the mobile device and the printed substrate are within the acceptable alignment tolerance; and
   if the mobile device and the printed substrate are not within the acceptable alignment tolerance instructing, by the processing device, a user of the mobile device to move the mobile device to align the mobile device and the printed substrate.

2. The method of claim 1, further comprising:
   notifying, by the processing device, the user when the mobile device and the printed substrate are aligned; and
   capturing, by the image capturing device, an image of the printed substrate.

3. The method of claim 2, wherein the notifying comprises at least one of:
   providing a visual cue to the user;
   providing an audio cue to the user; and
   providing a haptic cue to the user.

4. The method of claim 2, wherein notifying the user when the mobile device and the printed substrate are aligned further comprises:
   if the mobile device and the printed substrate are within the acceptable alignment tolerance, notifying the user.

5. The method of claim 1, wherein determining the location and the geometry of the printed substrate comprises:
   extracting a set of straight line features from the image stream of the printed substrate;
   computing a plurality of vanishing points of converging line sets from the straight-line features; and
   generating an estimate of a surface normal of a plane of the printed substrate.

6. The method of claim 1, wherein determining the location and the geometry of the printed substrate comprises:
   identifying one or more corners of the printed substrate, wherein the printed substrate comprises a flat surface; and
   estimating a two-dimensional shape of a boundary of the printed substrate based upon the identified one or more corners.

7. The method of claim 1, wherein determining the location and the geometry of the printed substrate comprises:
   extracting a set of features from the image stream of the printed substrate; and
   matching the set of features to corresponding features of a reference template document comprising a known location and geometry.

8. The method of claim 1, wherein the at least a first visual marker comprises a plurality of planar strips that are positioned perpendicular to a plane of the printed substrate.

9. The method of claim 1, wherein instructing a user of the mobile device to move the mobile device to align the mobile device and the printed substrate comprises overlaying at least a second visual marker defining a direction of movement for moving the mobile device such that the mobile device is aligned with the printed substrate.

10. The method of claim 1, wherein the mobile device is at least one of a smartphone and a tablet computing device.

11. The method of claim 7, wherein:
    extracting the set of features comprises extracting an arrangement unique to the printed substrate of at least one of the following: a text block arrangement, a whitespace, or an image; and
    matching the set of features to corresponding features of a reference template document comprising a known location and geometry comprise instructions to identify a corresponding arrangement in a reference template.

12. The method of claim 1, further comprising displaying an icon on the display, wherein the icon illustrates to the user an appearance of the visual marker when the mobile device and the printed substrate are within an acceptable alignment tolerance.

13. A device for aligning an image of a printed substrate using a mobile device, the device comprising:
    a processor;
    an image capturing device operably connected to processor;
    a display operably connected to the processor; and
    a computer readable medium operably connected to the processor, the computer readable medium containing a set of instructions configured to instruct the device to perform the following:
    receive, by the image capturing device, an image stream of a printed substrate,
    determine, by the processor, a location and a geometry of the printed substrate from the image stream,
    display the image stream on the display,
    overlay, by the processor, at least a first visual marker onto the printed substrate as displayed in the image stream using the location and geometry,
    determine, by the processing device, an acceptable alignment tolerance based on at least one of the following: a quality of the image capturing device or a capability of available post image capture processing software;
    determine, by the processing device, if the mobile device and the printed substrate are within the acceptable alignment tolerance, and
    if the mobile device and the printed substrate are not within the acceptable alignment tolerance instruct, by the processor, a user of the mobile device to move the mobile device to align the mobile device and the printed substrate.

14. The device of claim 13, wherein the set of instructions further comprise instructions configured to instruct the device to perform the following:
    notify, by the processor, the user when the mobile device and the printed substrate are aligned; and
    capture, by the image capturing device, an image of the printed substrate.

15. The device of claim 14, wherein the instructions configured to instruct the device to notify comprise instructions to perform at least one of:
provide a visual cue to the user;
provide an audio cue to the user; and
provide a haptic cue to the user.

16. The device of claim 14, wherein the instructions configured to instruct the device to notify further comprise instructions to perform the following:
if the mobile device and the printed substrate are within the acceptable alignment tolerance, notify the user.

17. The device of claim 13, wherein the instructions configured to instruct the device to determine the location and the geometry of the printed substrate comprise instructions to perform the following:
extract a set of straight line features from the image stream of the printed substrate;
compute a plurality of vanishing points of converging line sets from the straight-line features; and
generate an estimate of a surface normal of a plane of the printed substrate.

18. The device of claim 13, wherein the instructions configured to instruct the device to determine the location and the geometry of the printed substrate comprise instructions to perform the following:
identify one or more corners of the printed substrate, wherein the printed substrate comprises a flat surface; and
estimate a two-dimensional shape of a boundary of the printed substrate based upon the identified one or more corners.

19. The device of claim 13, wherein the instructions configured to instruct the device to determine the location and the geometry of the printed substrate comprise instructions to perform the following:
extract a set of features from the image stream of the printed substrate; and
match the set of features to corresponding features of a reference template document comprising a known location and geometry.

20. The device of claim 13, wherein the at least a first visual marker comprises a plurality of planar strips that are positioned perpendicular to a plane of the printed substrate.

21. The device of claim 13, wherein the instructions configured to instruct the device to instruct a user of the mobile device to move the mobile device to align the mobile device and the printed substrate comprise instructions to perform the following:
overlay at least a second visual marker defining a direction of movement for moving the mobile device such that the mobile device is aligned with the printed substrate.

22. The device of claim 13, wherein the mobile device is at least one of a smartphone and a tablet computing device.

23. The device of claim 19, wherein:
the instructions to extract the set of features comprise instructions to extract an arrangement unique to the printed substrate of at least one of the following: a text block arrangement, a whitespace, or an image; and
the instructions to match the set of features to corresponding features of a reference template document comprising known location and geometry comprise instructions to identify a corresponding text block arrangement in a reference template.

24. The device of claim 13, further comprising wherein the set of instructions further comprises instructions configured to cause the display to display an icon, wherein the icon illustrates to the user an appearance of the visual marker when the mobile device and the printed substrate are within an acceptable alignment tolerance.

* * * * *